US008578012B2

(12) United States Patent
Bradetich et al.

(10) Patent No.: US 8,578,012 B2
(45) Date of Patent: Nov. 5, 2013

(54) LOCAL INTELLIGENT ELECTRONIC DEVICE (IED) RENDERING TEMPLATES OVER LIMITED BANDWIDTH COMMUNICATION LINK TO MANAGE REMOTE IED

(75) Inventors: Ryan Bradetich, Pullman, WA (US); Jason A. Dearien, Moscow, ID (US); Barry Jakob Grussling, Pullman, WA (US); Gavin Remaley, Eagle, ID (US)

(73) Assignee: Schweitzer Engineering Laboratories Inc, Pullman, WA (US)

( * ) Notice: Subject to any disclaimer, the term of this patent is extended or adjusted under 35 U.S.C. 154(b) by 185 days.

(21) Appl. No.: 13/175,516

(22) Filed: Jul. 1, 2011

(65) Prior Publication Data

US 2012/0005326 A1    Jan. 5, 2012

Related U.S. Application Data

(60) Provisional application No. 61/361,201, filed on Jul. 20, 2010.

(51) Int. Cl.
 *G06F 15/173* (2006.01)
(52) U.S. Cl.
 USPC .......................................................... 709/223
(58) Field of Classification Search
 USPC .................. 709/217, 223, 224, 227–229; 713/182–186
 See application file for complete search history.

(56) References Cited

U.S. PATENT DOCUMENTS

| | | | | |
|---|---|---|---|---|
| 4,864,601 A | * | 9/1989 | Berry | 379/93.07 |
| 5,694,399 A | * | 12/1997 | Jacobson et al. | 709/246 |
| 5,963,734 A | * | 10/1999 | Ackerman et al. | 703/18 |
| 6,219,697 B1 | * | 4/2001 | Lawande et al. | 709/221 |
| 6,973,589 B2 | * | 12/2005 | Wright et al. | 714/14 |
| 6,988,025 B2 | * | 1/2006 | Ransom et al. | 700/295 |
| 7,353,282 B2 | * | 4/2008 | Nichols et al. | 709/229 |
| 7,664,869 B2 | * | 2/2010 | Baker et al. | 709/230 |
| 8,179,161 B1 | * | 5/2012 | Williams et al. | 326/86 |
| 2002/0133254 A1 | | 9/2002 | Elwood | |
| 2005/0010323 A1 | | 1/2005 | Cocciadiferro | |
| 2005/0132241 A1 | | 6/2005 | Curt | |
| 2006/0116794 A1 | * | 6/2006 | Stoupis et al. | 700/286 |
| 2006/0117295 A1 | * | 6/2006 | Wu et al. | 717/104 |
| 2006/0269066 A1 | | 11/2006 | Whitehead | |

(Continued)

OTHER PUBLICATIONS

PCT/US2011/042844 Patent Cooperation Treaty, International Search Report and Written Opinion of the International Searching Authority, Aug. 11, 2011.

*Primary Examiner* — Lance L Barry
(74) *Attorney, Agent, or Firm* — Jared L. Cherry

(57) ABSTRACT

The present disclosure provides systems and methods for remote device management. According to various embodiments, a local intelligent electronic device (IED) may be in communication with a remote IED via a limited bandwidth communication link, such as a serial link. The limited bandwidth communication link may not support traditional remote management interfaces. According to one embodiment, a local IED may present an operator with a management interface for a remote IED by rendering locally stored templates. The local IED may render the locally stored templates using sparse data obtained from the remote IED. According to various embodiments, the management interface may be a web client interface and/or an HTML interface. The bandwidth required to present a remote management interface may be significantly reduced by rendering locally stored templates rather than requesting an entire management interface from the remote IED. According to various embodiments, an IED may comprise an encryption transceiver.

25 Claims, 14 Drawing Sheets

(56) References Cited

U.S. PATENT DOCUMENTS

| | | |
|---|---|---|
| 2006/0271244 A1 | 11/2006 | Cumming |
| 2007/0055889 A1* | 3/2007 | Henneberry et al. ......... 713/186 |
| 2008/0018496 A1* | 1/2008 | Tanner et al. ................. 340/992 |
| 2008/0150736 A1* | 6/2008 | Fang ............................. 340/600 |
| 2008/0162930 A1* | 7/2008 | Finney et al. ................. 713/165 |
| 2010/0004792 A1* | 1/2010 | Lopez et al. .................. 700/292 |
| 2012/0005326 A1* | 1/2012 | Bradetich et al. ............. 709/223 |
| 2012/0226386 A1* | 9/2012 | Kulathu et al. ............... 700/295 |

* cited by examiner

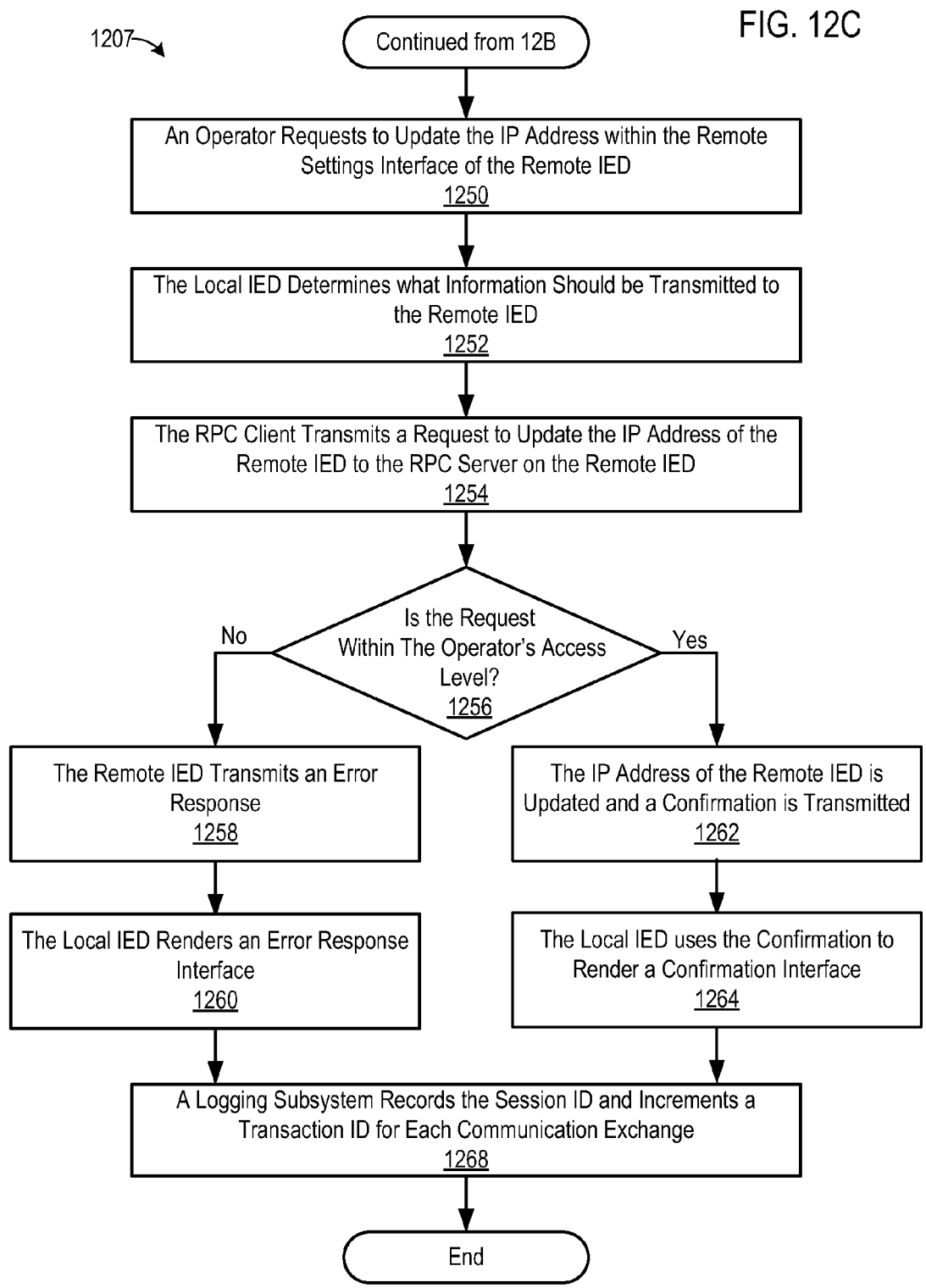

LOCAL INTELLIGENT ELECTRONIC DEVICE (IED) RENDERING TEMPLATES OVER LIMITED BANDWIDTH COMMUNICATION LINK TO MANAGE REMOTE IED

RELATED APPLICATIONS

The present application claims the benefit under 35 U.S.C. §119(e) of U.S. Provisional Patent Application No. 61/361,201 filed Jul. 2, 2010, titled "REMOTE DEVICE MANAGEMENT," which application is incorporated herein by reference in its entirety.

FEDERALLY SPONSORED RESEARCH

The United States Government may have certain rights in the claimed subject matter pursuant to Department of Energy Contract No. DE-FC26-07NT43311.

TECHNICAL FIELD

This disclosure relates to remote management of intelligent electronic devices. More particularly, this disclosure relates to remote device management over a limited bandwidth communication link.

BRIEF DESCRIPTION OF THE DRAWINGS

Non-limiting and non-exhaustive embodiments of the disclosure are described, including various embodiments of the disclosure with reference to the figures, in which:

FIGS. 12A-12C provide flow charts of a method for remote device management via a web client using locally rendered templates, according to various embodiments.

Figure 1:
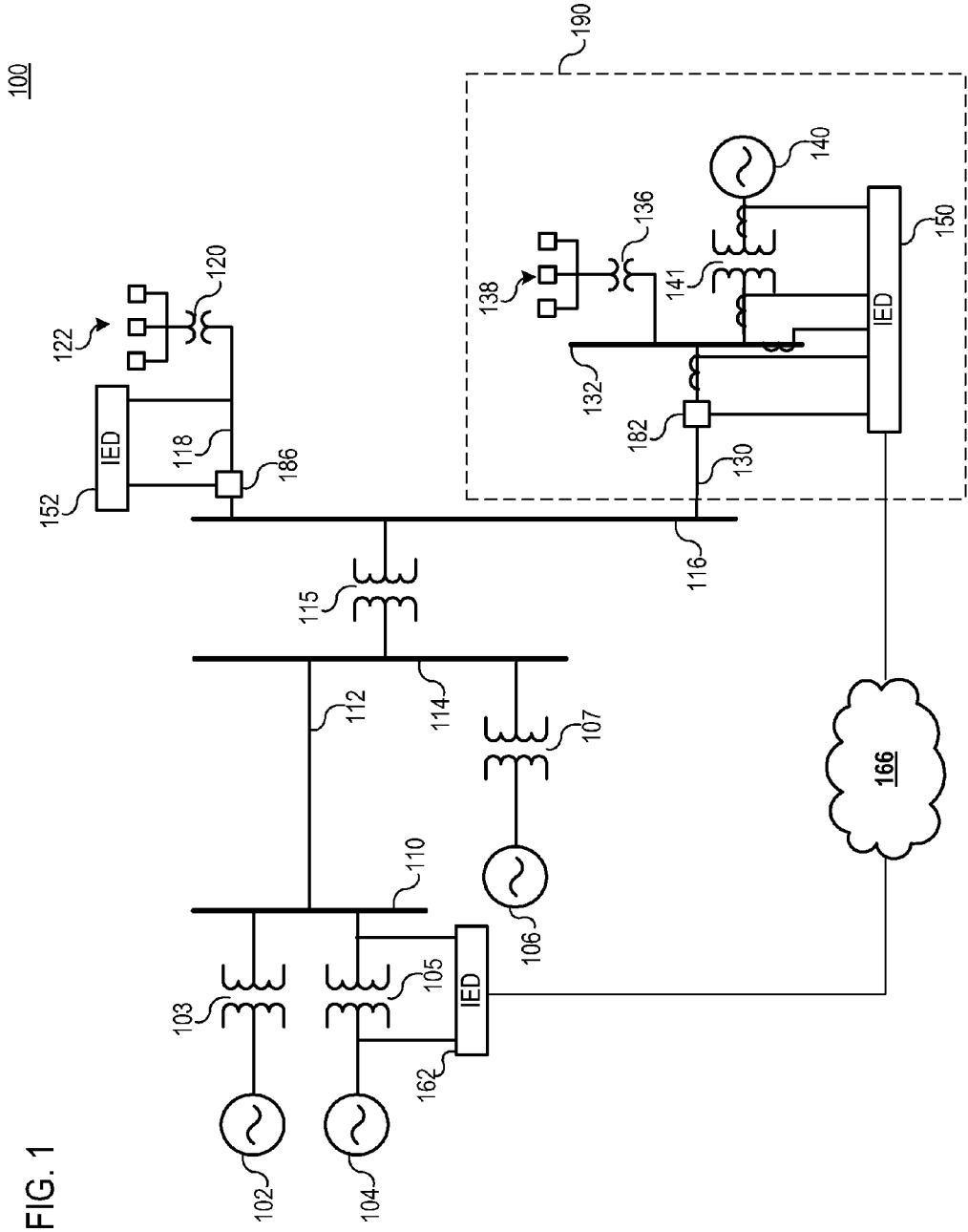
FIG. 1 illustrates an embodiment of a one-line diagram of an electrical power delivery system including multiple intelligent electronic devices (IEDs) in communication with one another.

In the following description, numerous specific details are provided for a thorough understanding of the various embodiments disclosed herein. The systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

Intelligent electronic devices (IEDs) may be used for monitoring, protecting and/or controlling industrial and utility equipment, such as in electric power delivery system. Multiple IEDs may be interconnected via a communication network and may utilize a SCADA system. According to some embodiments, communication between electrical substations may take place over the Public Switched Telephone Network (PSTN) or other existing infrastructure. Encryption transceivers may be utilized to increase the security of communications between various IEDs and/or components of a SCADA system. According to various embodiments, encryption transceivers may be added to existing base stations, SCADA components, and/or IEDs via software updates, firmware updates, and/or through the use of additional hardware.

A control center for a power distribution system may include an encryption transceiver configured to encrypt outgoing communications and decrypt incoming communications. A substation within the power distribution system may include a corresponding encryption transceiver. According to various embodiments, a serial connection utilizing a relatively low baud rate may connect the two encryption transceivers. Accordingly, while the encryption transceivers and/or IEDs within the power distribution system may be capable of supporting remote management features, in practice, the relatively slow serial connection between the devices may prevent traditional remote management interfaces. This disclosure provides systems and methods for remote management of IEDs utilizing locally stored templates conditionally rendered based on sparse data. Accordingly, an operator of a local IED may utilize a remote management interface even when the communication link between the local IED and the remote IED has a relatively low bandwidth.

According to various embodiments, a local IED may present a locally stored web client interface configured to allow an operator to modify network settings, permissions, add or remove operator profiles, update login credentials, and the like. The web client interface may render locally stored templates based on the access level of a specific operator. The web client templates of a local IED and a remote IED may be identical or substantially similar. Accordingly, when an operator of a local IED requests a specific management interface or configuration page from a remote IED, the local IED may simply request sparse data from the remote IED in order to render locally stored templates. That is, rather than request an entire graphical interface from the remote IED, the local IED may render locally stored templates using sparse data obtained from the remote IED.

As the operator views and/or modifies various configurations, settings, user accounts, and/or permissions, the local remote procedural call (RPC) client may request sparse data from the remote RPC server sufficient for the local web client to conditionally render locally stored templates.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. In particular, "an embodiment" may be a system, an article of manufacture (such as a computer-readable storage medium), a method, or a product of a process.

The phrases "connected to" and "in communication with" refer to any form of interaction between two or more components, including mechanical, electrical, magnetic, and electromagnetic interaction. Two components may be connected to each other, even though they are not in direct contact with each other, and even though there may be intermediary devices between the two components. For instance, an IED may be connected to a gateway session manager through one or more intermediary IEDs or networking devices.

As used herein, the term IED may refer to any microprocessor-based device that monitors, controls, automates, and/or protects monitored equipment within a system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. IEDs may be connected to a network, and communication on the network may be facilitated by networking devices including, but not limited to, multiplexers, routers, hubs, gateways, firewalls, and switches. Furthermore, networking and communication devices may be incorporated in an IED or be in communication with an IED. For instance, an IED may be an encryption device configured to encrypt outgoing communications and/or decrypt incoming communications. Alternatively, an IED may include an integrated encryption device configured to encrypt outgoing communications and/or decrypt incoming communications. The term IED may be used interchangeably to describe an individual IED or a system comprising multiple IEDs.

While the following description utilizes examples of remotely managed IEDs in an electric power delivery system, the presently disclosed systems and methods may be applied to any system where remote management of one device using a second device is needed. For example, in addition to electric power delivery systems, remote management of IEDs via low-bandwidth connections may be applied to natural gas delivery systems, water delivery systems, telephone delivery systems, network monitoring systems, industrial plant utilities, deep-water vessels, ships, and various distributed generation operations.

As used herein, the term "login credentials" may refer to any type of authentication method known to be useful in the art. For example, login credentials commonly refer to an ASCII encoded username and password combination; accordingly, the terms "login credentials" and "username and password(s)" may be used interchangeably herein. However, username and password(s) may be replaced with any of a wide variety of authentication protocols and/or techniques including cryptographic protocols for authenticating machines, challenge-response methods, zero-knowledge proofs, time-synchronized single use passwords, security tokens, biometric authentication, graphical or other non-text based passwords, voice authentication, and the like.

Some of the infrastructure that can be used with embodiments disclosed herein is already available, such as: general-purpose computers, computer programming tools and techniques, digital storage media, and communications networks. A computer may include a processor, such as a microprocessor, microcontroller, logic circuitry, or the like. The processor may include a special purpose processing device, such as an ASIC, PAL, PLA, PLD, Field Programmable Gate Array, or other customized or programmable device. The computer may also include a computer-readable storage device, such as non-volatile memory, static RAM, dynamic RAM, ROM, CD-ROM, disk, tape, magnetic, optical, flash memory, or other computer-readable storage medium.

Suitable networks for configuration and/or use, as described herein, include one or more local area networks, wide area networks, metropolitan area networks, and/or "Internet" or internet protocol (IP) networks, such as the World Wide Web, a private Internet, a secure Internet, a value-added network, a virtual private network, an extranet, an intranet, or even standalone machines that communicate with other machines by physical transport of media. In particular, a suitable network may be formed from parts or entireties of two or more other networks, including networks using disparate hardware and network communication technologies. A network may incorporate landlines, wireless communication, or combinations thereof.

The network may include communications or networking software, such as software available from Novell, Microsoft, Artisoft, and other vendors, and may operate using TCP/IP, SPX, IPX, and other protocols over twisted pair, coaxial, or optical fiber cables, telephone lines, satellites, microwave relays, modulated AC power lines, physical media transfer, and/or other data transmission "wires". The network may encompass smaller networks and/or be connectable to other networks through a gateway or similar mechanism.

Aspects of certain embodiments described herein may be implemented as software modules or components. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The software modules described herein tangibly embody programs, functions, and/or instructions that are executable by computer(s) to perform tasks as described herein. Suitable software, as applicable, may be provided using the teachings presented herein and programming languages and tools, such as XML, Java, Pascal, C++, C, database languages, APIs, SDKs, assembly, firmware, microcode, and/or other languages and tools. Additionally, software, firmware, and hardware may be interchangeably used to implement a given function or software module.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments. In other instances, well-known structures, materials, or operations are not shown or described in detail to avoid obscuring aspects of this disclosure. In addition, the steps of a method do not necessarily need to be executed in any specific order, or even sequentially, nor need the steps be executed only once, unless otherwise specified.

FIG. 1 illustrates one embodiment of a diagram of an electric power delivery system 100. Electric power delivery system 100 may include a plurality of IEDs 150, 152, and 162 configured to monitor, control, and/or protect various components of the electric power delivery system 100. The electric power delivery system 100 may also include generators 102, 104, and 106 configured to generate electric power. As illustrated, generators 102 and 104 feed step-up transformers 103 and 105 to step up the voltage on bus 110 for transmission on transmission line 112. Transmission line 112 may supply power to bus 114. Generator 106 may also provide power to bus 114 via step-up transformer 107. Step-down transformer 115 may step the voltage down from voltage levels suitable for transmission to voltage levels more suitable for distribution. Distribution bus 116 may distribute power to feeder 118 and feeder 130. Feeders 118 and 130 may distribute power to various loads 122 and 138, and may further step down the voltage before providing power to the loads using step-down transformers 120 and 136.

Feeder 130 (via bus 132) may also receive power from distributed generator 140, the voltage from which is stepped up as appropriate using transformer 141. Loads 138, distributed generator 140, and bus 132 may be part of a distributed cite 190. Distributed cite 190 may be an industrial facility with loads and generation such as a refinery, smelter, paper production mill, or the like.

Several components of electric power delivery system 100 may be monitored, controlled, and/or protected by one or more IEDs, such as IEDs 150, 152, and 162. For example, IEDs in addition to IEDs 150, 152, and 162 may be used to monitor, control, and/or protect various conductors, transformers, generators, buses, capacitor banks, circuit breakers, switches, voltage regulators, loads, batteries, and the like. Distributed cite 190 may include an IED 150 for monitoring, controlling, and protecting distributed generator 140 and/or transformer 141. Additionally, IEDs 150 and 152 may be in communication with circuit breakers 182 and 186, respectively. Circuit breaker 182 may be capable of disconnecting distributed cite 190 from the remainder of electric power delivery system 100.

Each IED may be in communication with one or more other IEDs. Some IEDs may be configured as central controllers, synchrophasor vector processors, automation controllers, programmable logic controllers, real-time automation controllers, SCADA systems, or the like. For example, IEDs 150 and 162 may be in communication via relatively low bandwidth communications link 166. Communications link 166 may be a serial link operating at less than 115200 baud.

Figure 2:
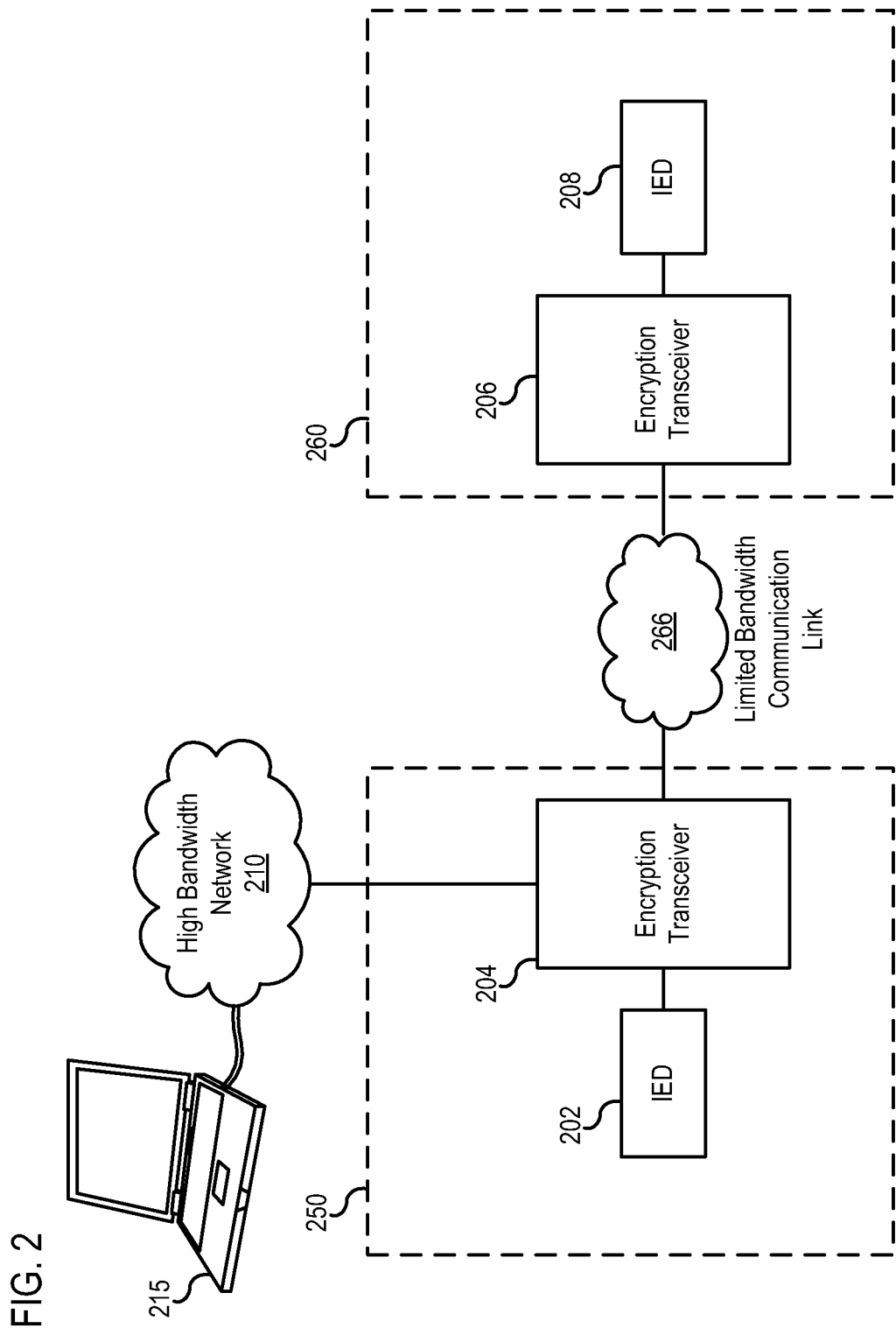
FIG. 2 illustrates a block diagram of an embodiment of encrypted serial communication between two IEDs.

FIG. 2 illustrates a block diagram of one embodiment of encrypted serial communication between a local portion 250 and a remote portion 260 of an electrical power distribution system. Local portion 250 may represent a SCADA system including at least one IED 202 and an encryption transceiver 204. Remote portion 260 may represent a power distribution substation and include at least one IED 208 and an encryption transceiver 206. According to various embodiments, encryption transceivers 204 and 206 may be integrated as software, firmware, and/or hardware components of IEDs 202 and 208, respectively. According to various alternative embodiments, encryption transceivers 204 and 206 may be stand-alone devices in communication with IEDs 202 and 208, respectively. According to various embodiments, local portion 250 may be accessible to an operator via a high bandwidth network 210. For example, an operator may utilize access device 215 to initialize, view, and/or modify settings on encryption transceiver 204 via high bandwidth network 210. In contrast, remote portion 260 may not be directly connected to high bandwidth network 210. Rather, remote portion 260 may be in communication with local portion 250 via communications link 266.

Communications link 266 may comprise a relatively low bandwidth link, such as a serial publically switched telephone network (PSTN). According to various embodiments, encryption transceivers 204 and 206 may provide strong authentication and encryption of RS232 communication links. Encryption transceivers 204 and 206 may support multiple operator profiles and allow for varying levels of access. Encryption transceivers may also track session and/or transactional history, prevent unauthorized changes to operator profiles and network settings, and the like. While the presently described embodiments specifically relate to encryption transceivers, it is understood that the systems and methods described herein may be equally applicable to various types of IEDs.

Figure 3:
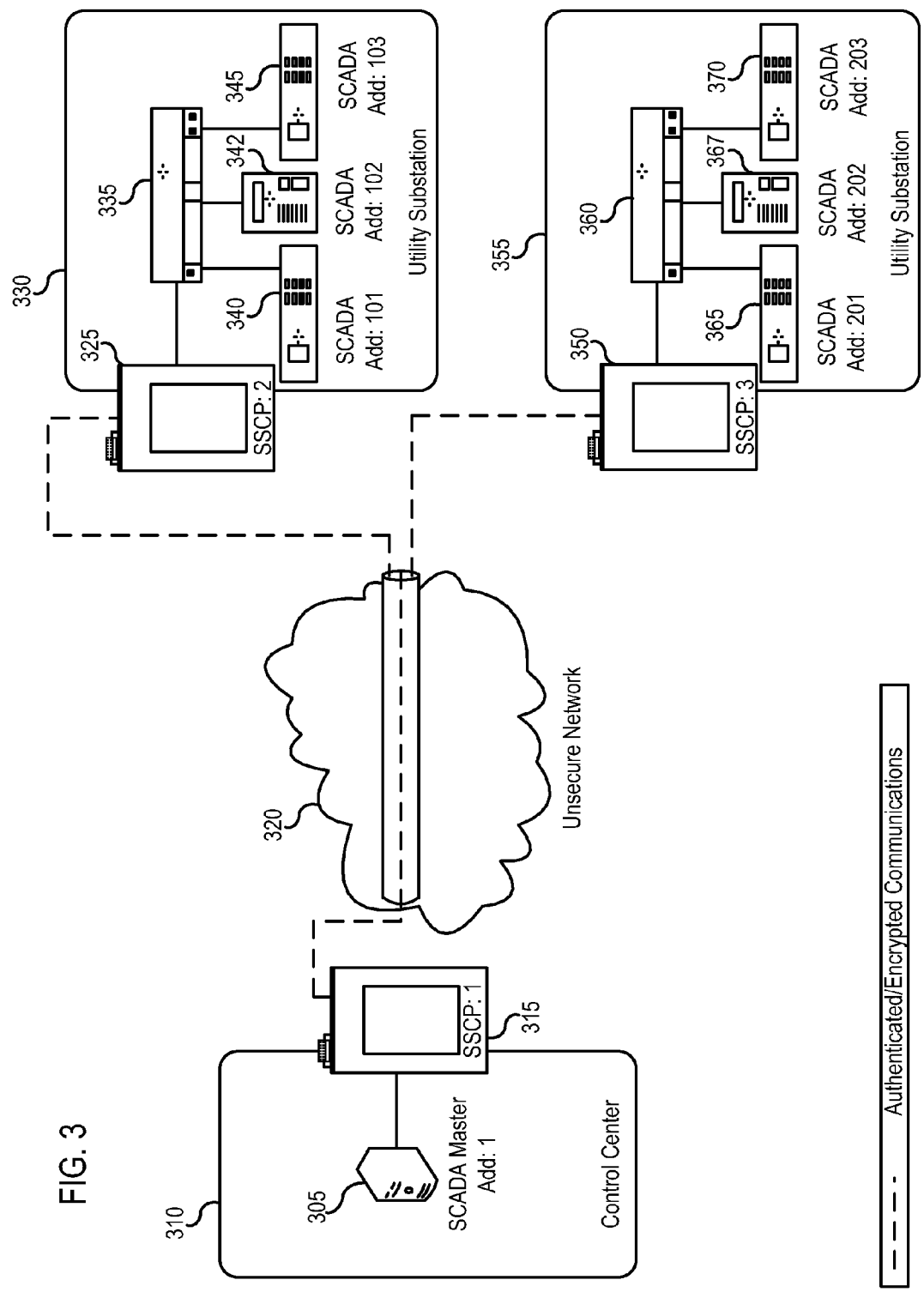
FIG. 3 illustrates a block diagram of an embodiment of encrypted communication between a supervisory control and data acquisition (SCADA) computer system and two remote substations.

FIG. 3 illustrates a block diagram of one embodiment of encrypted communication between a control center 310 and remote substations 330 and 355. As illustrated, control center 310 may include a SCADA computer system 305 configured to communicate with remote substations 330 and 355 via unsecure network 320. According to various embodiments, remote substations 330 and 355 may include one or more IEDs 335, 340, 342, 345, 360, 365, 367 and 370 configured to monitor, protect, and/or control components of an electric power delivery system. Each IED in communication with SCADA computer system 305 may be assigned a SCADA address. SCADA computer system 305 and IEDs 335, 340, 342, 345, 360, 365, 367, and 370 may or may not support operator authentication and/or encryption paradigms. Accordingly, control center 310 and utility substations 330 and 355 may each include an encryption transceiver 315, 325, and 350 configured to encrypt and decrypt communications transmitted over unsecure network 320. According to various embodiments, encryption transceivers may utilize any of a wide variety of encryption protocols, including Secure SCADA Communication Protocol (SSCP).

Additionally, each encryption transceiver may allow for multiple operator profiles. Each operator profile may be associated with a unique operator or access device. For example, an encryption transceiver may support multiple username and password combinations, each with varying levels of access. Possible access levels may include variations on an operator's ability to read and write to specific systems and/or files associated with an encryption transceiver. Some operators may have permission to modify account and network settings within an encryption transceiver, while others may only have permission to transmit and receive communications.

According to various embodiments, encryption transceivers 325 and 350 may be remotely managed through encryption transceiver 315. Encryption transceiver 315 may provide a web client interface through which an operator may remotely logon to encryption transceivers 325 and 350. According to various embodiments, encryption transceivers 315, 325, and 350 may each include a unique list of operator profiles. Each operator profile may include a username and password and indicate what access level the operator should be granted. Additionally, encryption transceivers 315, 325, and 350 may each include a database of templates used to render a management interface. According to various embodiments, each encryption transceiver's database may include a similar or identical set of templates.

Accordingly, when an operator attempts to manage a remote encryption transceiver using a local encryption transceiver, the local encryption transceiver may render templates based on sparse data received from the remote encryption transceiver. The bandwidth necessary to present an operator with a management interface for a remote encryption transceiver is thereby greatly reduced.

Figure 4:
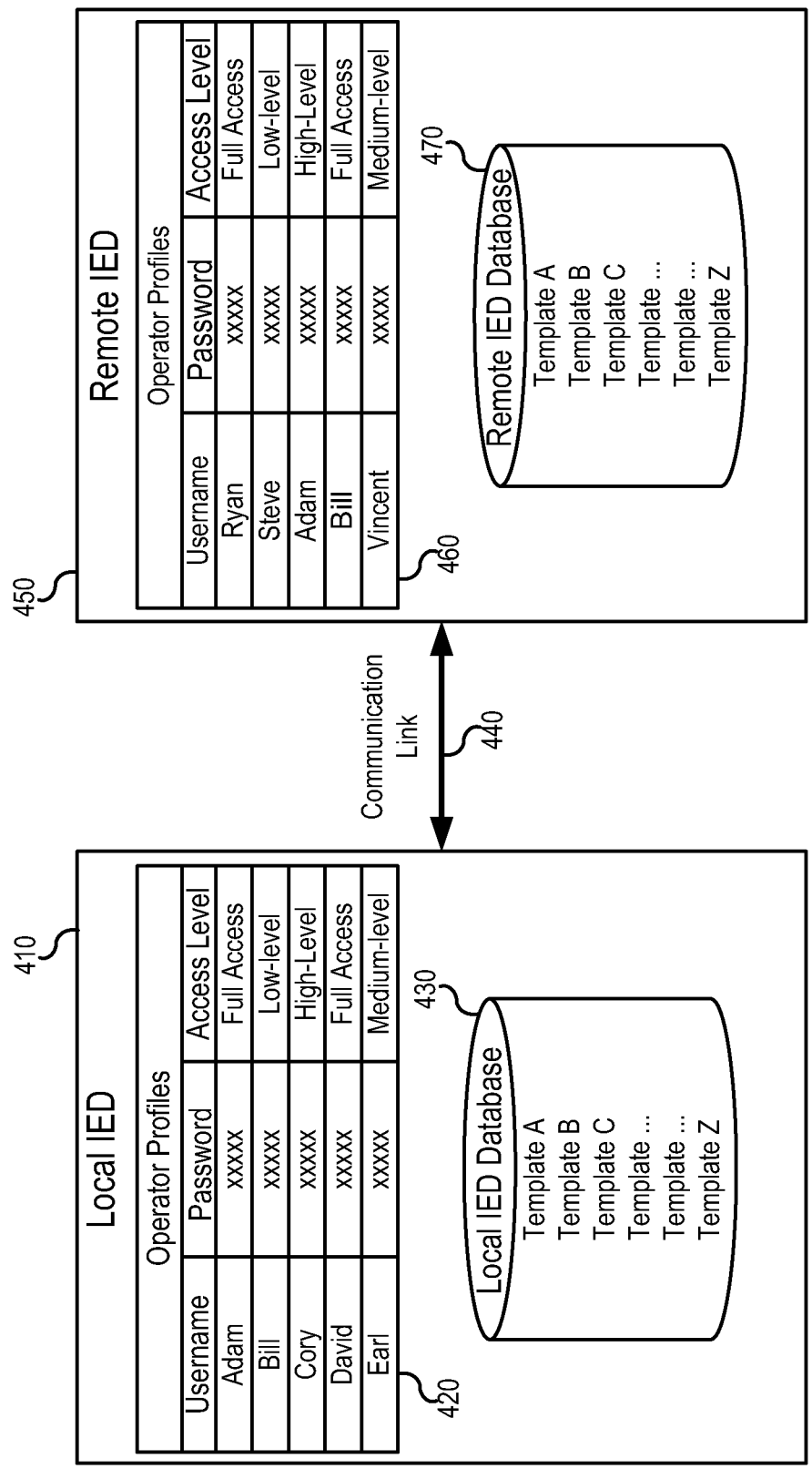
FIG. 4 illustrates a block diagram of an embodiment of a local IED and a remote IED, where each IED includes a common template database.

As illustrated in FIG. 4, a local IED 410 may include various operator profiles 420 and a database 430 containing templates A-Z for rendering management interfaces. According to various embodiments, an operator profile may include a username, a password, and an access level for local IED 410. For example, Adam may have full access to view and/or modify network settings of local IED 410. In contrast, Bill may have only low-level access, allowing him to utilize Local IED 410 for limited purposes, but perhaps not modify network settings.

In an embodiment in which local IED 410 is an encryption transceiver, Bill might be limited to sending and receiving encrypted communications and prevented from modifying network settings and operator profile information. Adam may have full access to the encryption transceiver, allowing him to add or remove operator profiles, modify network settings, and update configuration files in addition to sending and receiving encrypted communications.

According to various embodiments, local IED 410 may present a management interface, such as a web client interface, to authorized operators in order to allow them to view and/or modify settings specific to local IED 410. Utilizing the management interface, an authorized operator may be able to add or remove operator profiles, update configuration files, modify network settings, and/or make other system changes. According to various embodiments, the management interface may render templates stored within database 430 based on the access level of the operator. For example, Adam may have access to all of templates A-Z, while Earl may only have access to some of templates A-Z. Accordingly, local IED 410 may render different templates for different operators, presenting each operator with a management interface corresponding to their specific access level.

Similarly, remote IED 450 may include various operator profiles 460 and a database 470 containing templates A-Z. Database 470 may contain substantially identical or similar templates to those within database 430. Accordingly, the management interface of remote IED 450 may be similar or identical to that of local IED 410. Utilizing the management interface of remote IED 450, an authorized operator within operator profiles 460 may add or remove operator profiles, update configuration files, modify network settings, and/or make other system changes.

Local IED 410 may be in communication with remote IED 450 via communication link 440. According to various embodiments, communication link 440 may have limited bandwidth, may be a serial connection, and/or may utilize a PSTN. For example, communication link 440 may comprise a serial link operating at less than 115200 baud. Accordingly, communication link 440 may not have sufficient bandwidth to support a traditional remote management web interface.

Local IED 410 may provide a remote management interface allowing an operator to manage remote IED 450 over a low-bandwidth communication link, such as communication link 440. According to various embodiments, an operator may utilize the management interface of local IED 410 to request a remote management interface for remote IED 450. Local IED 410 may utilize a template stored in database 430 to prompt the operator for login credentials. Local IED 410 may then request that remote IED 450 verify that the login credentials belong to an authorized operator of remote IED 450. Remote IED 450 may then transmit sparse data associated with the operator profile 460 and/or system information to local IED 410. Local IED 410 may then render a template using the sparse data in order to present a management interface for remote IED 450. The templates rendered by local IED 410 may be stored within database 430, thereby reducing the amount of data that must be transmitted between local IED 410 and remote IED 450.

To provide an example, Bill, who has low-level access on local IED 410, may request a remote management interface for remote IED 450. Local IED 410 may transmit Bill's login credentials to remote IED 450. Remote IED 450 may transmit sparse data via communication link 440 to local IED 410. The sparse data may indicate that Bill may be provided full access to all of templates A-Z. The sparse data may also include data useful for rendering one or more of templates A-Z. Local IED 410 may then render one or more of templates A-Z stored within database 430 utilizing the sparse data to present Bill with a remote management interface.

Bill may then request a network settings interface within the remote management interface. Local IED 410 may request data, such as the current network settings, from remote IED 450. Remote IED 450 may return sparse data (e.g., the current network settings) to local IED 410. Local IED 410 may then utilize the sparse data to render a locally stored template in order to present Bill with the network settings interface. In addition to providing a low-bandwidth remote management interface, local IED 410 and/or remote IED 450 may include logging subsystems configured to record session data and/or transactional data associated with each operator profile. Accordingly, a historical record of sessions and transactions may be maintained. A communication session between local IED 410 and remote IED 450 may remain open until a logout request is made and/or the session expires due to time limitations or inactivity.

Figure 5:
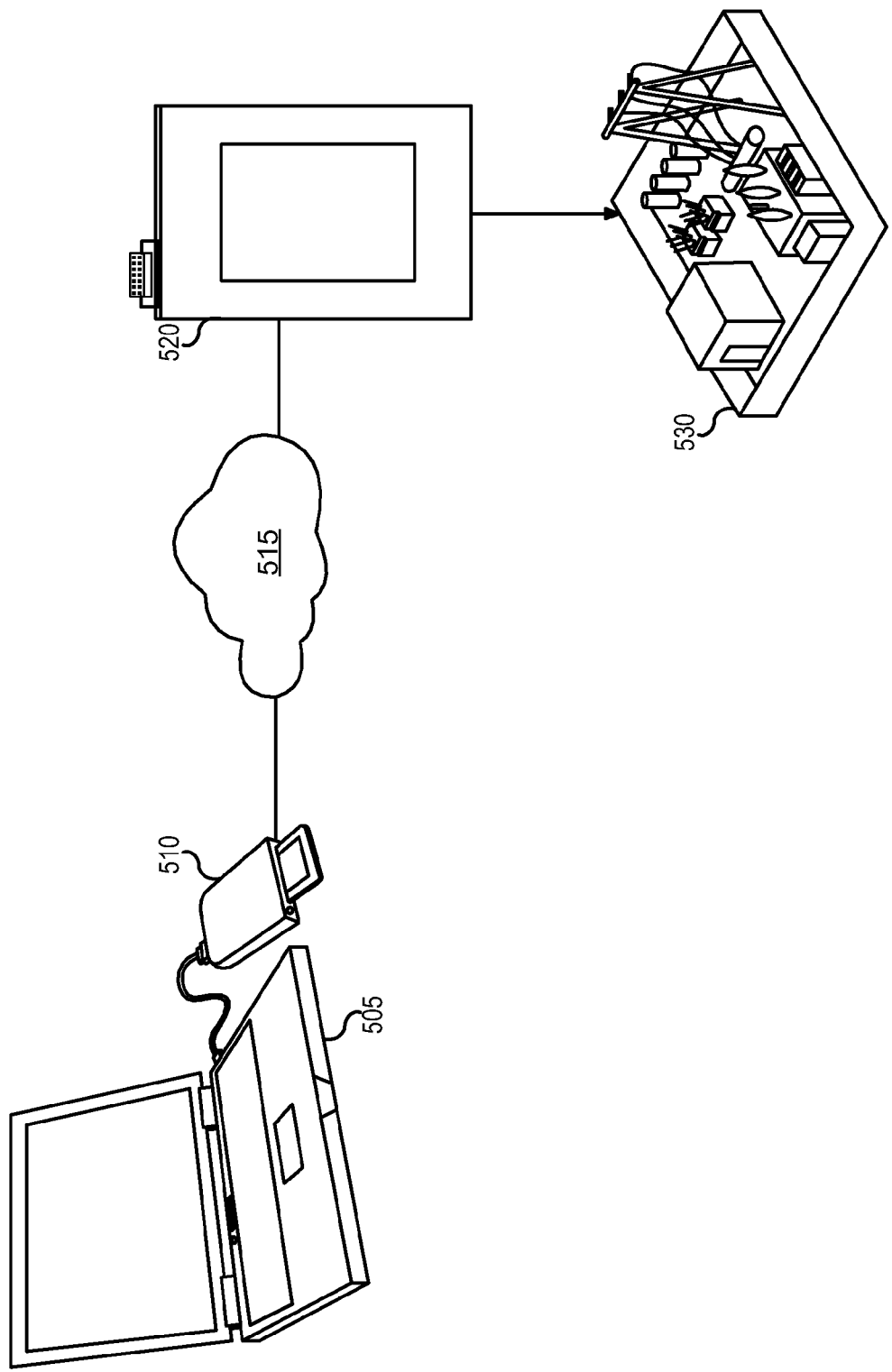
FIG. 5 illustrates an embodiment of a laptop connected to a local encryption transceiver configured to provide remote device management.

FIG. 5 illustrates one embodiment of a laptop 505 in communication with a remote substation 530 via communication link 515. Communication between laptop 505 and remote substation 530 may be encrypted using encryption transceivers 510 and 520. An operator of laptop 505 may utilize the management interface of encryption transceiver 510 to initialize, view, and/or modify various settings of encryption transceiver 510. For example, an operator may select the type of encryption to be used via the management interface of encryption transceiver 510.

Rather than physically access remote encryption transceiver 520, the operator may utilize the management interface of local encryption transceiver 510 to remotely manage remote encryption transceiver 520. According to various embodiments, local encryption transceiver 510 and remote encryption transceiver 520 may each contain a database of common templates used to present an operator with a management interface. Accordingly, local encryption transceiver 510 may verify that the operator of laptop 505 has an appropriate access level on remote encryption transceiver 520. Remote encryption transceiver 520 may then transmit sparse data via communication link 515 indicating which common templates should be rendered. The sparse data may also provide local encryption transceiver 510 with sufficient information to conditionally render the templates with information about remote encryption transceiver 520. According to various embodiments, remote management systems and methods as described herein may be directly implemented by IEDs and/or other computer systems.

Figure 6:
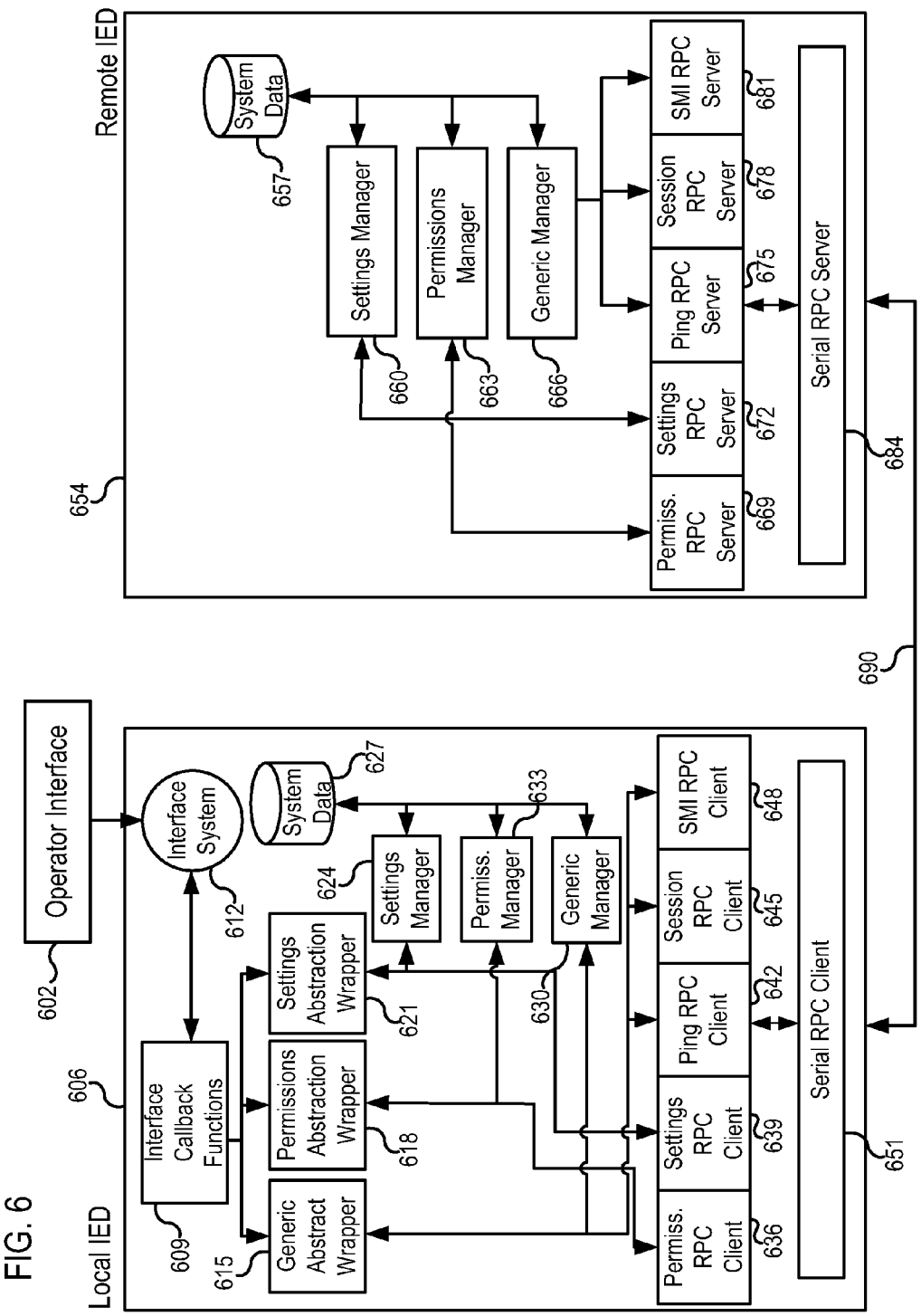
FIG. 6 illustrates an embodiment of an IED configured to provide remote device management using a remote procedural call (RPC) client.

FIG. 6 illustrates one embodiment of a local IED 606 configured with a remote management system including remote procedural call (RPC) clients 636, 639, 642, 645, and 648. Local IED 606 may include an interface system 612 with various callback functions 609. Abstraction wrappers 615, 618, and 621 may convert data transmitted between interface system 612 and RPC clients 636-648. Serial RPC client 651 may be configured to manage the data transfer between local IED 606 and remote IED 654.

Local IED 606 may also include settings 624, permissions 633, and generic 630 manager modules connected to system data 627. According to various embodiments, system data 627 may contain a plurality of templates for rendering and presenting a management interface via operator interface 602. For example, an operator may login via operator interface 602 and modify settings of local IED 606. Local IED 606 may present the operator a management interface by rendering templates stored in system data 627. If an operator modifies local settings, then settings manager 624 may coordinate and facilitate the modification. Similarly, permission manager 633 and generic manager 630 may coordinate local modifications to permissions and generic configuration files, respectively.

According to various embodiments, RPC clients 636-648 may enable an operator to remotely manage remote IED 654 using local IED 606. Accordingly, an operator may request a management interface for remote IED 654 via operator interface 602. Remote IED 654 may be in communication with local IED 606 via a communication link 690 with limited bandwidth. Requests to modify settings, permissions, and generic configuration files on remote IED 654 may be handled by RPC clients 636-648. Local IED may make an RPC request via communications link 690 to remote IED 654. Serial RPC server 684 may receive the RPC requests and forward them to RPC servers 669-681. RPC servers 669-681 may then interact with settings manager 660, permissions manager 663, and/or generic manager 666 to determine what data should be returned or modified within system data 657.

According to various embodiments, system data 627 on local IED 606 and system data 657 on remote IED 654 may each contain substantially similar or identical templates that may be used to render a management interface for the respective IEDs. Accordingly, local IED 606 may present an operator with a management interface for remote IED 654 by rendering locally stored templates utilizing sparse data received from remote IED 654. For example, if an operator attempts to modify the permissions of remote IED 654 via local IED 606, permissions RPC client 636 may communicate the request to permissions RPC server 669 via communications link 690. Permissions RPC server 669 may determine what data should be returned for local IED 606 in order to present the operator with an appropriate management interface.

Figure 7:
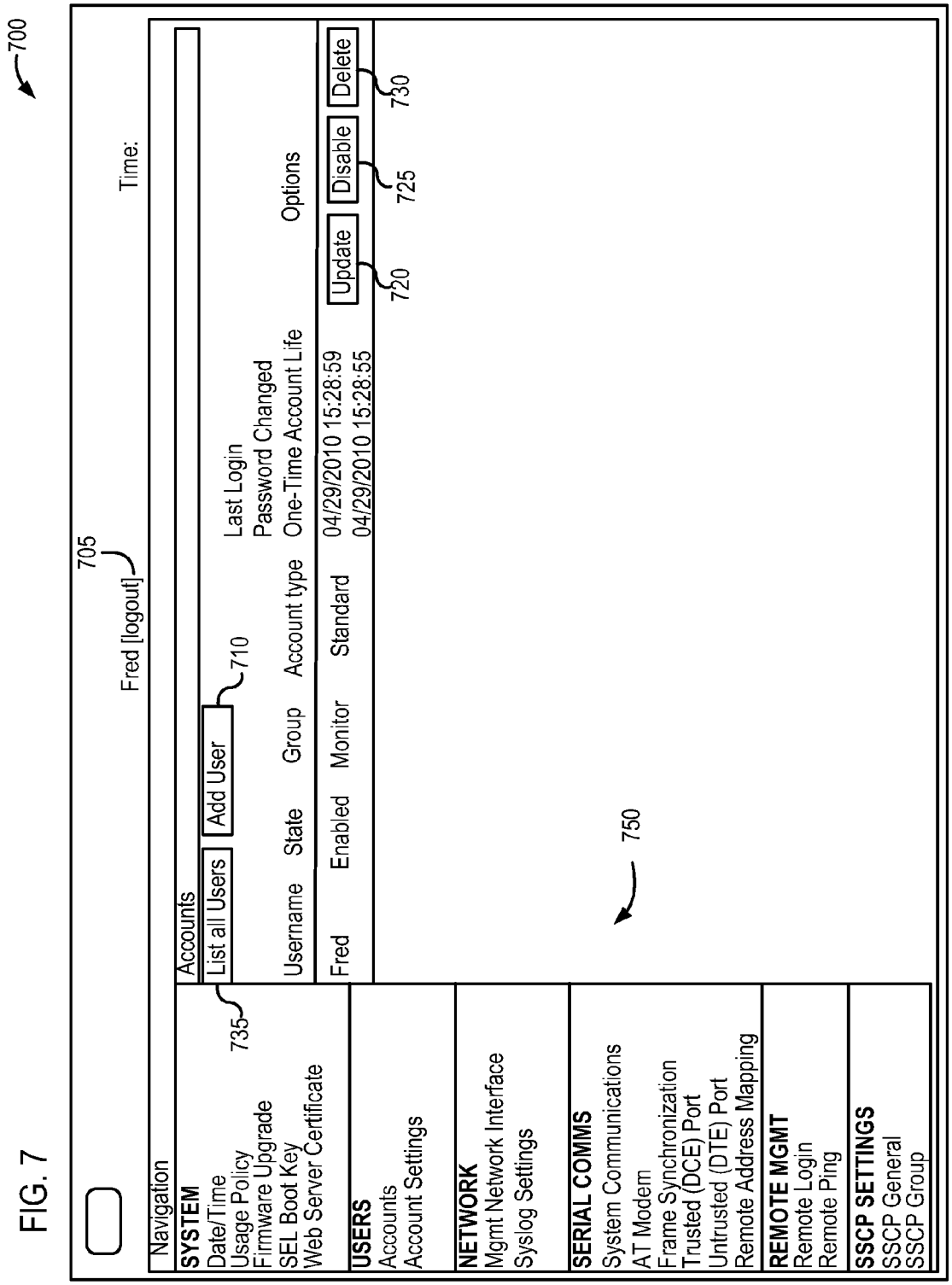
FIG. 7 illustrates an embodiment of a screenshot of a management interface for a local IED.

FIG. 7 illustrates an embodiment of a screenshot of a management interface 700 for a local IED. According to various embodiments, a local IED may present this or a similar management interface 700 to an authorized operator attempting to initialize, view, and/or modify settings of the local IED. The templates used to generate management interface 700 may be stored locally. As illustrated, management interface 700 may indicate the name of the operator and provide an option to logout 705. An operator may be presented with options to see a list of all users 735 and to add users 710. Additionally, an operator profile may be updated 720, disabled 725, and/or deleted 730. A left side panel may include various navigation links 750. As illustrated, one such block of links may be called Remote MGMT and allow an operator to login and access a management interface for a remote IED via the local IED. According to various embodiments, any number of these functions and options may be disabled based on the access level of the operator. In this case, Fred may have full access to the local IED.

Figure 8:
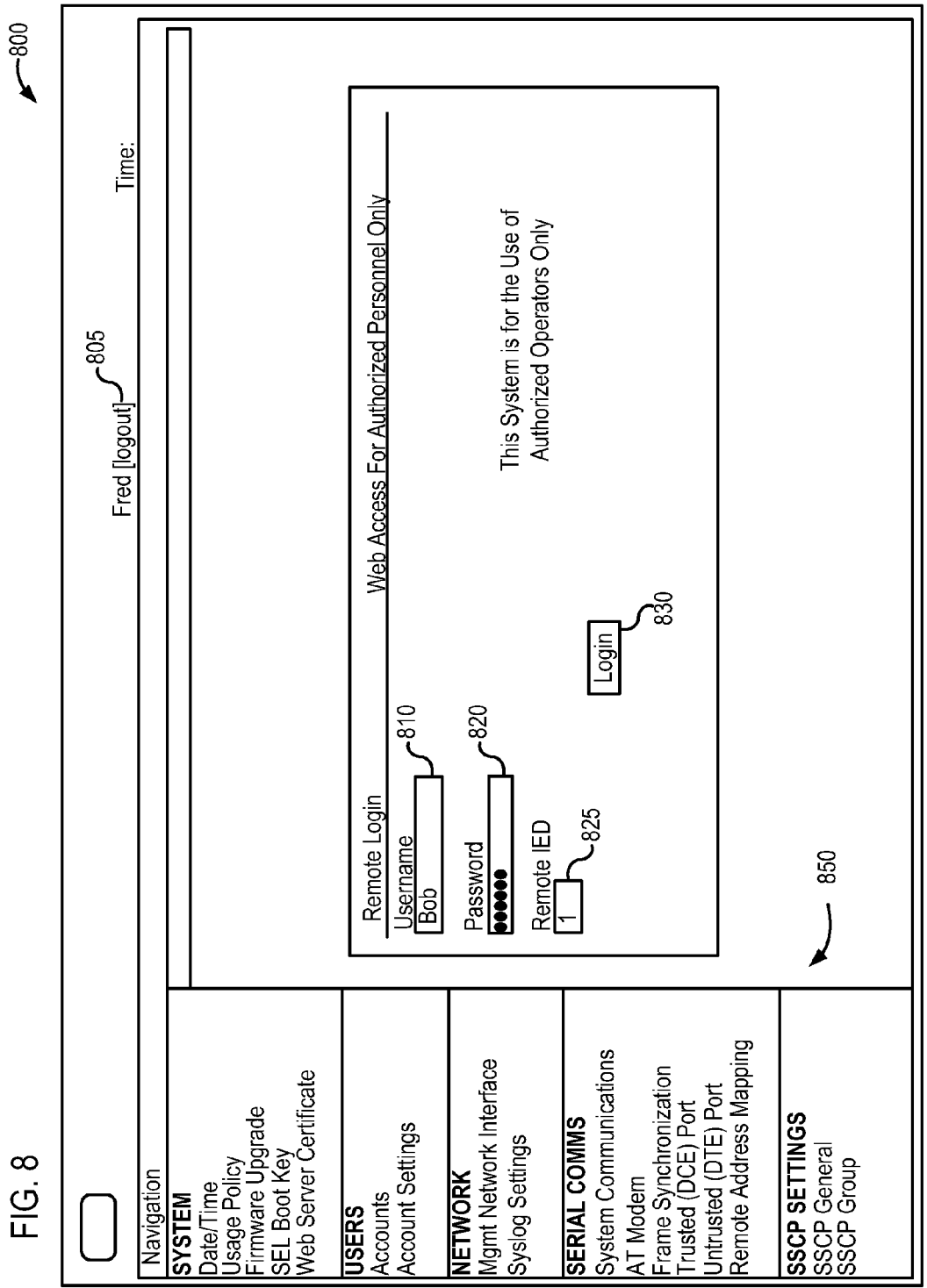
FIG. 8 illustrates an embodiment of a screenshot of a login interface allowing an operator to login to a remote IED.

FIG. 8 illustrates an embodiment of a screenshot of a login interface 800 allowing an operator to login to a remote IED via a local IED. As illustrated, the operator may be logged in as Fred 805 on the local IED while logging in as Bob 810 on the remote IED. Login credentials, such as a username 810 and a password 820, may be required to access a management interface for a remote IED. Alternatively, management interface 800 may automatically utilize the operator's initial login credentials to login to a remote device. In this case, Fred's login credentials could have been automatically passed on to the remote IED.

As illustrated, an operator may provide login credentials and select the IED for remote management, at 825. A left side panel may include various navigation links 850 and a login button 830 may allow an operator to submit login credentials and a request to login to a remote IED. According to various embodiments, login interface 800 may be rendered by the local IED using locally stored templates. According to various embodiments, the remote IED may validate the login credentials and determine the access level of Bob on the remote IED. The remote IED may then transmit sparse data to the local IED. The local IED may utilize the sparse data in conjunction with locally stored templates to present a management interface for the remote IED based on Bob's access level and system information from the remote IED.

Figure 9:
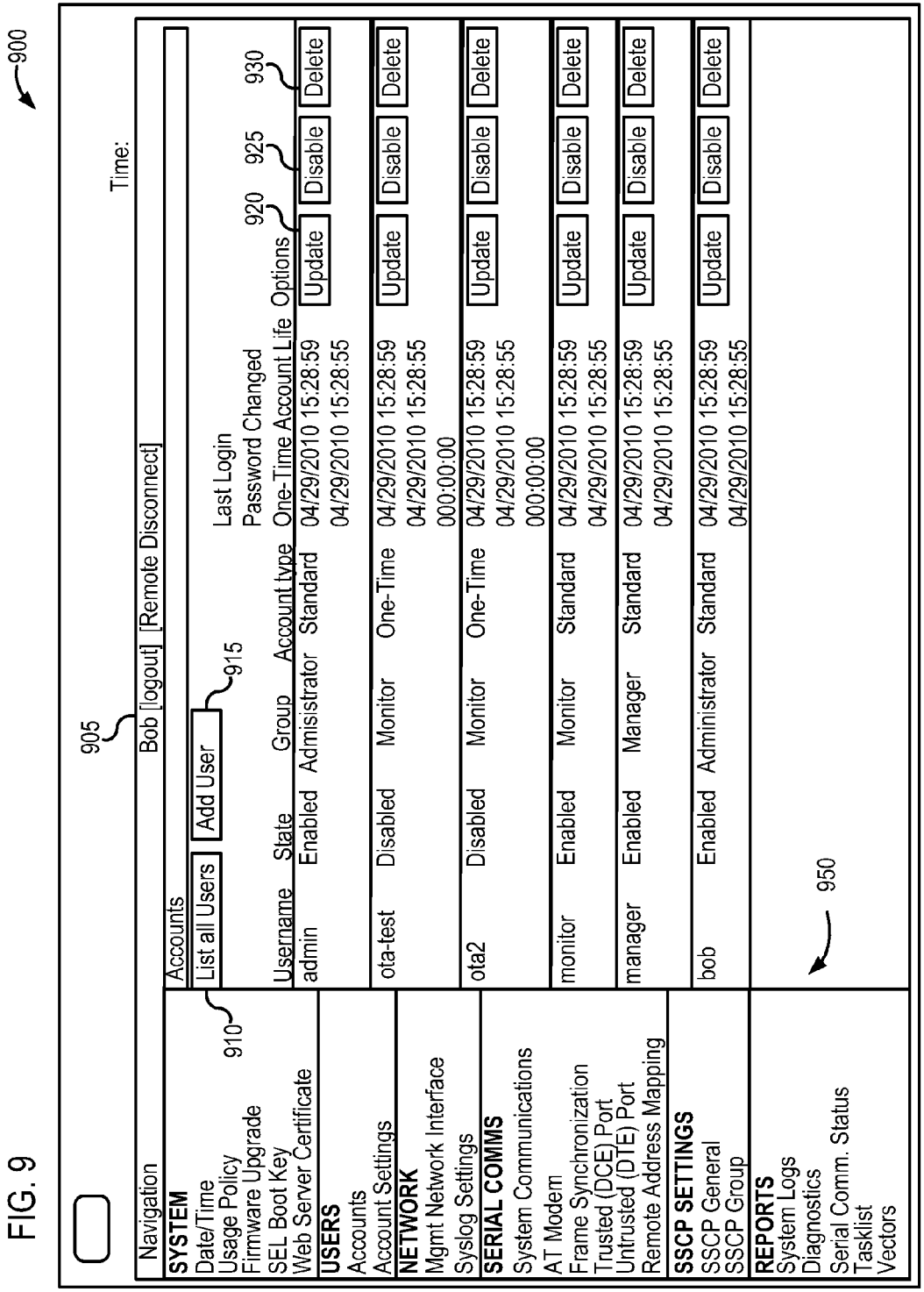
FIG. 9 illustrates an embodiment of a screenshot of a management interface for a remote IED accessed via a local IED.

FIG. 9 illustrates an embodiment of a screenshot of a management interface 900 for a remote IED accessed via a local IED. As illustrated, operator Bob is remotely logged in, at 905, and may logout or remotely disconnect. Additionally, the management interface 900 for the remote IED may allow Bob to list all users 910, add users 915, update an operator profile 920, disable an operator profile 925, and/or delete an operator profile 930. According to various embodiments, management interface 900 for the remote IED may be rendered by the local IED utilizing locally stored templates. The local IED may use sparse data transmitted from the remote IED to render the locally stored templates in order to populate IED-specific fields and/or to limit the templates and options based on the access level granted to Bob on the remote IED.

Management interface 900 may also include a panel of links 950 to other useful interfaces within management interface 900. For example, Bob could select a link within the SSCP Settings to view and/or modify an encryption setting of an encryption transceiver. According to various embodiments, if an operator attempts to modify a setting within management interface 900, the local IED may transmit a corresponding request to the remote IED. The remote IED may respond with sparse data confirming the modification. The local IED may then render locally stored templates using sparse data in order to present a management interface.

For example, if Bob attempts to change the IP address of the remote IED, the remote IED may return sparse data indicating that the IP address has been modified or sparse data indicating that Bob does not have a sufficient access level to make the change. The local IED may then use the sparse data to render a template in order to present an appropriate interface, whether confirming the change or indicating the error. Similarly, if Bob selects a link 950, the remote IED may return sparse data sufficient for the local IED to render a locally stored template based on Bob's access level on the remote IED and/or the status of the remote IED. Since the local IED renders locally stored templates, even IEDs connected via low-bandwidth communication links may be remotely managed with a fully functional interface, such as a web client interface.

Figure 10:
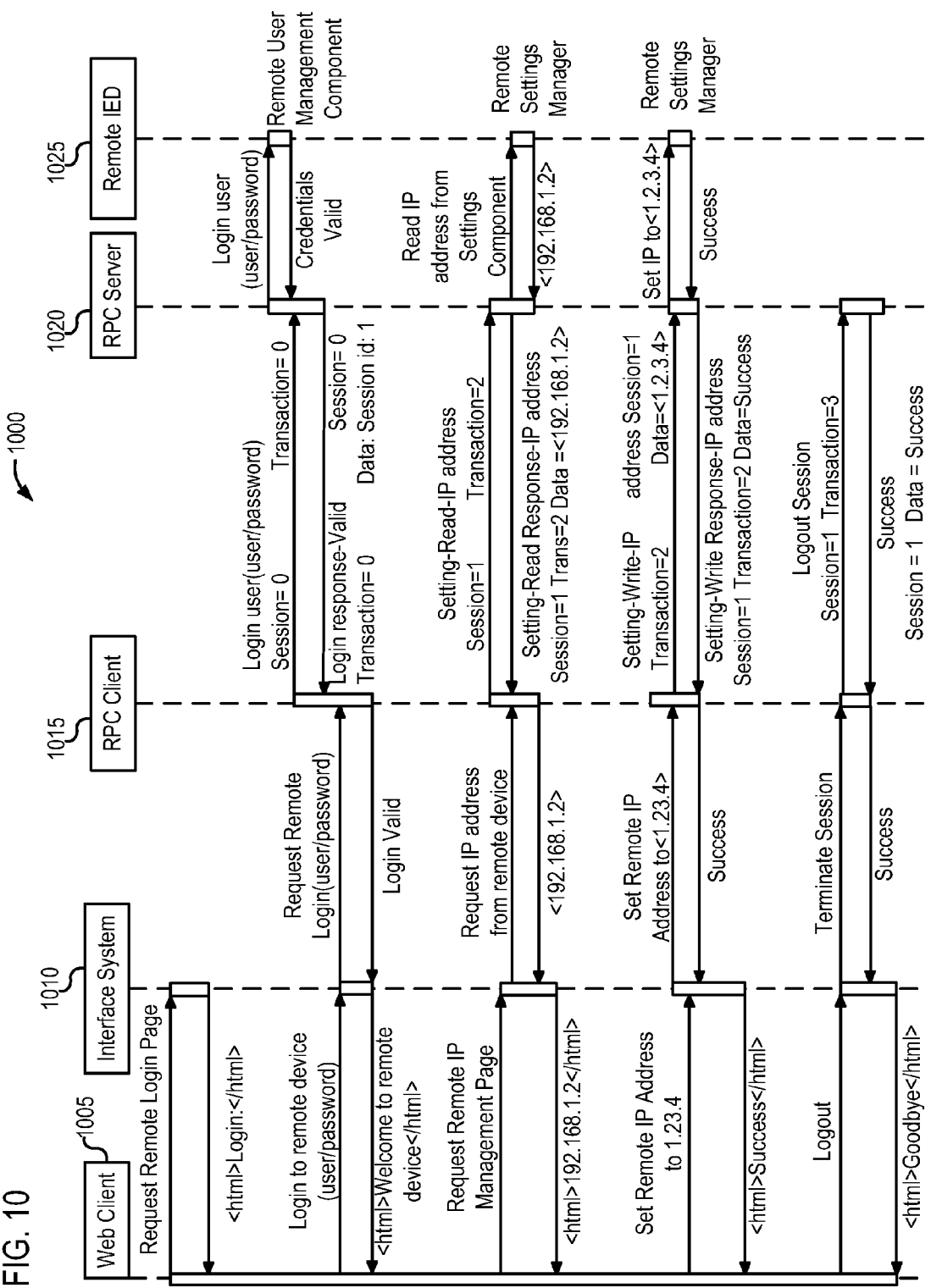
FIG. 10 illustrates a transactional diagram of a local IED using remote procedural calls to manage a remote IED, according to one embodiment.

FIG. 10 illustrates a transactional diagram 1000 of a local IED using remote procedural calls to manage a remote IED 1025, according to one embodiment. The local IED may present a management interface for a remote IED 1025 to an operator. The management interface may comprise a web client interface 1005, through which an operator may manage remote IED 1025. The local IED may render locally stored templates using sparse data in order to present a web client interface 1005.

Initially, an operator may request a remote login page via web client 1005 and interface system 1010 may return an HTML interface prompting the user to enter login credentials. The operator may then enter login credentials via the HTML interface. Interface system 1010 may determine that the operator's actions are not intended for the local IED and therefore transmit them to an RPC client 1015. RPC client 1015 may then initiate a session with an RPC server 1020 of remote IED 1025. According to various embodiments, the local IED and/or remote IED 1025 may record session and/or transactional history.

Remote IED 1025 may validate the login credentials and return sparse data via RPC server 1020 and RPC client 1015. Interface system 1010 may then render a locally stored template utilizing the sparse data in order to present the operator with a management interface indicating a successful logon. According to various embodiments, the HTML management interface for remote IED 1025 may include any number of navigational links and/or provide an operator with the option to initialize, view, and/or modify various aspects of remote IED 1025. The management interface may be customized to include or omit specific links and/or options depending on the operator's access level on the remote device. For example, some operators may have full access rights, while others may only have permission to modify and/or view certain aspects of remote IED 1025.

The operator may utilize the management interface to request a remote IP management page. Interface system 1010 may retrieve the locally stored template for the remote IP management page and determine that it needs the IP address of remote IED 1025. Accordingly, interface system 1010 may then request the IP address of remote IED 1025 via RPC client 1015. Remote IED 1025 may return its IP address via RPC server 1020. The local IED may then render the locally stored template for the remote IP management page using the returned IP address.

As described above, the local IED may not need to request the entire remote IP management page from the remote IED 1025. Rather, the local IED may render a locally stored template for the remote IP management page utilizing sparse data (the IP address of the remote IED) received from the remote IED 1025. Accordingly, even a relatively low-bandwidth communication link may be used to provide a remote management interface for an IED.

The operator may then utilize the remote IP management page to set the remote IP address of the remote IED 1025. Again, as illustrated in FIG. 10, the data transmitted between RPC client 1015 and RPC server 1020 is minimized. Once the IP address is set, remote IED 1025 may return sparse data so indicating. Interface system 1010 may then present an interface indicating that the IP address was successfully set.

Figure 11:
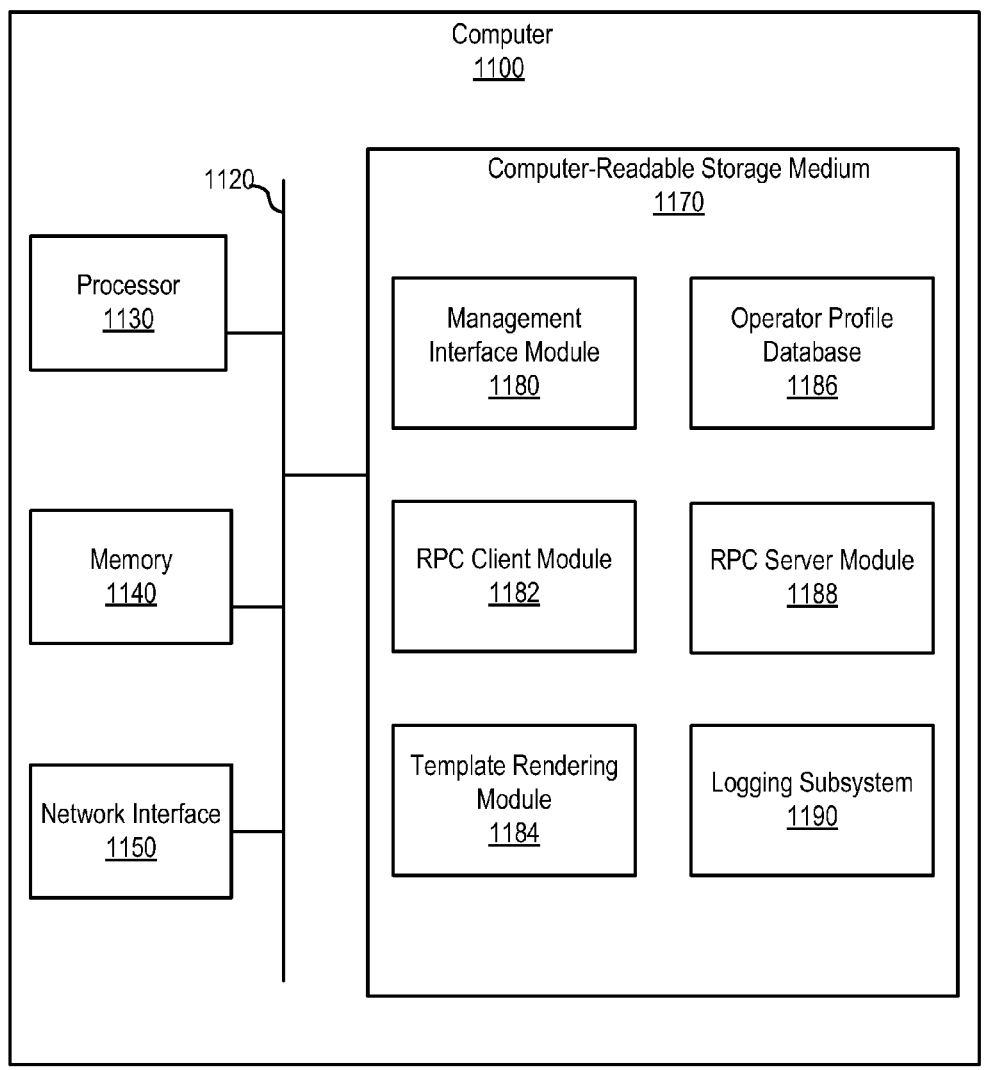
FIG. 11 illustrates an embodiment of a function block diagram of a computer system configured to provide remote device management using locally stored templates.

FIG. 11 illustrates one embodiment of a function block diagram of a computer system 1100 configured to provide remote device management by rendering locally stored templates. As illustrated, a computer 1100 may include a processor 1130, memory 1140 (RAM), and a network interface 1150 in communication with computer-readable storage medium 1170 via bus 1120. Computer-readable storage medium 1170 may include one or more software modules 1180-1190 configured to allow for the remote management of an IED using locally stored templates. According to various embodiments, one or more of software modules 1180-1190 may alternatively be implemented using firmware and/or hardware. Additionally, one or more software modules 1180-1190 may be joined together as a single module and/or separated into a plurality of sub-modules.

According to various embodiments, a management interface module 1180 may be configured to present a management interface to an operator for local and/or remote IEDs. For example, an interface module may be configured to present an HTML web client management interface to an operator. Additionally, management interface module 1180 may be configured to process requests received from an operator. RPC client module 1182 may be configured to communicate with an RPC server module 1188 of a remote IED. According to various embodiments, the RPC client 1182 and RPC server 1188 modules may coordinate communication between a local IED and a remote IED via a limited bandwidth communication link.

A template rendering module 1184 may be configured to render locally stored templates using sparse data received from a remote IED. Template rendering module 1184 may be configured to select a locally stored template based on an access level of an operator profile on the remote IED. Each IED may include an operator profile database 1186 configured to store operator profiles comprising usernames, passwords, access levels, and the like. Additionally, a logging subsystem 1190 may be configured to monitor and/or record session and/or transactional information. Accordingly, a historical record of which operators authorized what commands may be available.

Figure 12A:
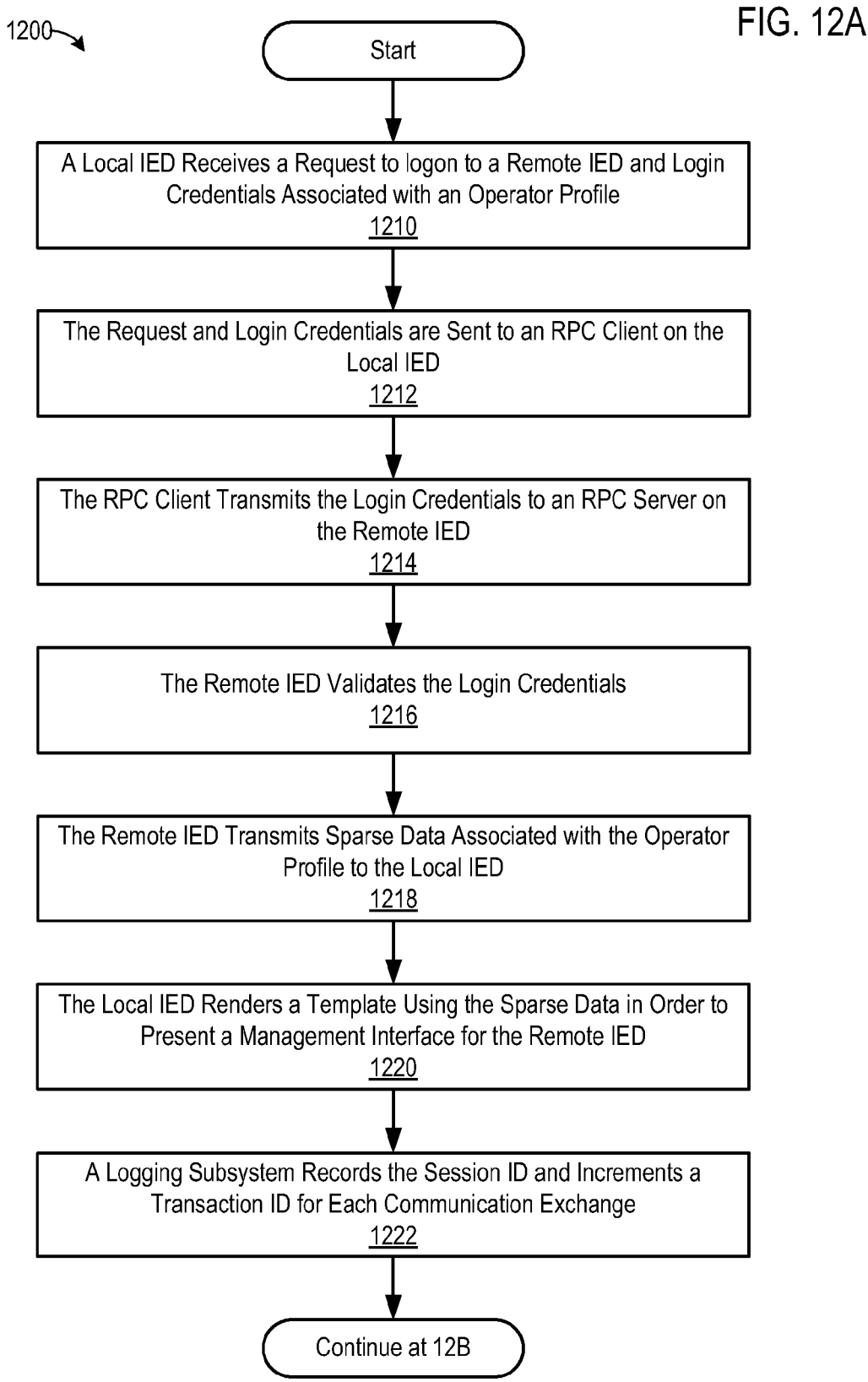
Figure 12B:
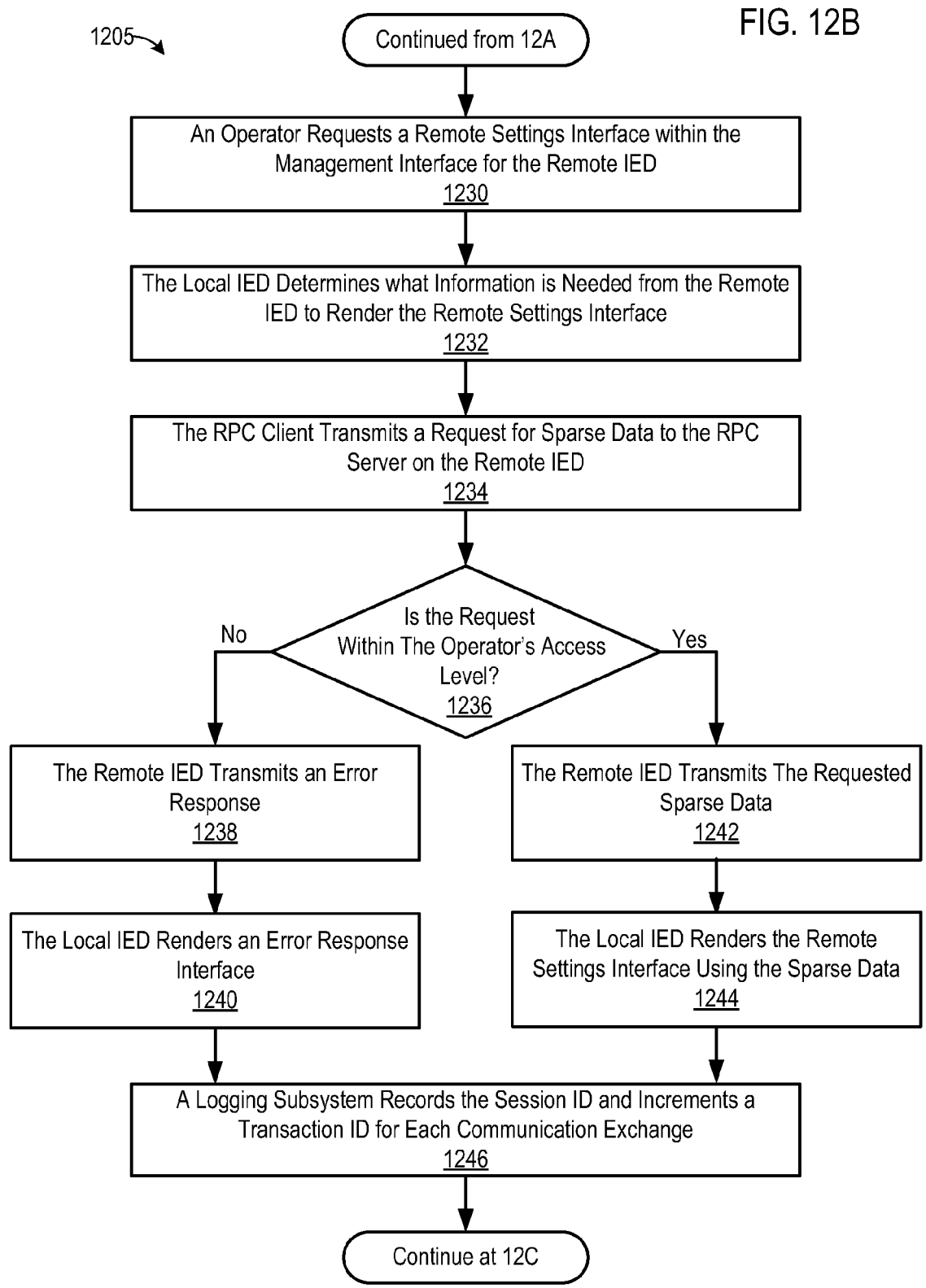

FIGS. 12A-12C provide flow charts 1200, 1205, and 1207 of a method for remote device management via a web client based on locally rendered templates, according to various embodiments. As illustrated in FIG. 12A, a local IED receives a request from an operator to logon to a remote IED, at 1210. The operator may then provide login credentials associated with an operator profile on the remote IED. The local IED, recognizing that the request for a management interface pertains to a remote IED, may validate the credentials via an RPC client in communication with a remote IED, at 1212. The RPC client may transmit the login credentials to an RPC server on the remote IED, at 1214. The remote IED may validate the login credentials, at 1216.

The remote IED may transmit sparse data associated with the operator profile to the local IED, at 1218. The local IED may render a locally stored template using the sparse data in order to present the operator with a management interface for the remote IED, at 1220. According to some embodiments, a logging subsystem may record the session ID and/or increment a transaction ID for each communication exchange, at 1222. According to various embodiments, the local IED may be in communication with the remote IED via a limited bandwidth link, such as a serial link operating at less than 115200 baud.

Continuing at FIG. 12B, once a local IED has presented a management interface for the remote IED, the operator may request to modify and/or view any of a wide variety of settings on the remote IED. For example, an operator may request a remote settings interface within the management interface for the remote IED, at 1230. The local IED may determine what information is needed from the remote IED in order to render the remote settings interface, at 1232. The RPC client may transmit a request for sparse data to the RPC server on the remote IED, at 1234.

The remote IED may determine if the request is within the operator's access level, at 1236. If the request exceeds the operator's access level, at 1236, then the remote IED may transmit sparse data indicating an error, at 1238. The local IED may then render an error response interface, at 1240. However, if the request is within the operator's access level, at 1236, then the remote IED may transmit the requested sparse data, at 1242. The local IED may then render the remote settings interface using the sparse data, at 1244. A logging subsystem may record the session ID and/or increment a transaction ID for each communication exchange, at 1246. For example, a transaction ID may be incremented in between each of steps 1230-1244.

Continuing at FIG. 12C, an operator may request to update the IP address of the remote IED within the remote setting interface, at 1250. The local IED may determine what information should be transmitted to the remote IED, at 1252. The RPC client may transmit a request to update the IP address of the remote IED to the RPC server on the remote IED, at 1254. Again, if the request is not within the operator's access level, at 1256, the remote IED may transmit an error response in the sparse data, at 1258. The local IED may utilize the error response to render an error response interface, at 1260. If the request to update the IP address is within the operator's access level, at 1256, the remote IED may update the IP address and transmit a confirmation in the sparse data, at 1262. The local IED may utilize the confirmation to render a confirmation interface, at 1264. As described above, a logging subsystem may record the session ID, transaction ID, and/or other records keeping data for various communication exchanges, at 1268.

According to various embodiments, an operator may remotely initialize, view, and/or modify any of a wide variety of configurations, operator profiles, and/or network settings of a remote IED utilizing a method similar to that described in conjunction with FIGS. 12B and 12C. According to various embodiments, the local IED renders locally stored templates in order to present the management interface for the remote IED. Accordingly, even IEDs connected via limited bandwidth communication links may be remotely managed using a local IED.

The above description provides numerous specific details for a thorough understanding of the embodiments described herein. However, those of skill in the art will recognize that one or more of the specific details may be omitted, modified, and/or replaced by a similar process or system.

What is claimed:

1. A method for managing a remote intelligent electronic device (IED) using a local IED, comprising:
    the local IED receiving a request to manage a remote IED in communication with the local IED via a limited bandwidth communication link;
    the local IED receiving login credentials associated with an operator profile on the remote IED;
    the local IED transmitting the received login credentials to the remote IED;
    the local IED requesting sparse data from the remote IED in order to render a first locally stored template;
    the local IED receiving the sparse data from the remote IED; and
    the local IED rendering the first locally stored template using the sparse data in order to present a management interface for the remote IED;
    the local IED receiving a request for a settings interface within the management interface for the remote IED;
    the local IED determining what additional data is needed from the remote IED to render a second template in order to present the settings interface for the remote IED;
    the local IED requesting additional sparse data associated with the settings interface for the remote IED;
    the local IED receiving the additional sparse data; and
    the local IED rendering the second template using the additional sparse data in order to present a settings interface for the remote IED.

2. The method of claim 1, wherein the local IED comprises an encryption transceiver.

3. The method of claim 1, wherein the local IED communicates with the remote IED using remote procedure calls via a remote procedure call (RPC) client.

4. The method of claim 1, wherein rendering the first locally stored template using the sparse data comprises:
    selecting the first locally stored template based on an access level associated with the operator profile; and
    rendering the first locally stored template using the sparse data in order to present the management interface for the remote IED.

5. The method of claim 1, wherein the limited bandwidth communication link comprises a serial link operating at less than 115200 baud.

6. The method of claim 1, wherein the management interface comprises a web client interface.

7. A method for managing a remote intelligent electronic device (IED) using a local IED, comprising:
    the local IED receiving a request to manage a remote IED in communication with the local IED via a limited bandwidth communication link;
    the local IED receiving login credentials associated with an operator profile on the remote IED;
    the local IED transmitting the received login credentials to the remote IED;
    the local IED requesting sparse data from the remote IED in order to render a first locally stored template;
    the local IED receiving the sparse data from the remote IED;

the local IED rendering the first locally stored template using the sparse data in order to present a management interface for the remote IED;

the local IED receiving a request to modify a setting within the management interface for the remote IED;

the local IED determining what settings data should be transmitted to the remote IED in order to modify the setting on the remote IED;

the local IED client transmitting the settings data to the remote IED in order to modify the setting;

the local IED receiving a confirmation that the setting has been modified; and the local IED rendering a second template using the received confirmation in order to present a confirmation interface for the remote IED.

8. The method of claim 7, wherein receiving a request to modify a setting comprises receiving a request to modify a network setting on the remote IED.

9. The method of claim 7, wherein receiving a request to modify a setting comprises receiving a request to modify an operator profile on the remote IED.

10. The method of claim 7, wherein the local IED comprises an encryption transceiver.

11. The method of claim 7, wherein the local IED communicates with the remote IED using remote procedure calls via a remote procedure call (RPC) client.

12. The method of claim 7, wherein rendering the first locally stored template using the sparse data comprises:

selecting the first locally stored template based on an access level associated with the operator profile; and rendering the first locally stored template using the sparse data in order to present a management interface for the remote IED.

13. The method of claim 7, wherein the management interface comprises a web client interface.

14. An intelligent electronic device (IED) configured to provide remote device management of a remote IED over a limited bandwidth communication link, comprising:

a processor;

at least one network interface configured to communicatively connect the IED to a remote IED via a limited bandwidth communication link;

a computer readable storage medium in communication with the processor, the computer readable storage medium comprising:

an interface module configured to receive a request to manage the remote IED, to receive login credentials associated with an operator profile of the remote IED, to receive a request for a settings interface within the management interface for the remote IED and to determine what additional data is needed from the remote IED for the template rendering module to render a second template in order to present the settings interface for the remote IED;

a remote procedure call (RPC) client module configured to transmit received login credentials to the remote IED, to and request sparse data from the remote IED in order to render a first locally stored template and to request additional sparse data associated with the settings interface for the remote IED; and a template rendering module configured to render the first locally stored template using the sparse data in order to present a management interface for the remote IED and render the second template using the additional sparse data in order to present a settings interface for the remote IED.

15. The system of claim 14, wherein the IED comprises an encryption transceiver.

16. The system of claim 14, wherein the template rendering module is configured to:

select the first locally stored template based on an access level associated with the operator profile; and render the selected first template using the sparse data in order to present a management interface for the remote IED.

17. The system of claim 14, wherein the limited bandwidth communication link comprises a serial link operating at less than 115200 baud.

18. The system of claim 14, wherein the interface module is configured to present the management interface for the remote IED as a web client interface.

19. An intelligent electronic device (IED) configured to provide remote device management of a remote IED over a limited bandwidth communication link, comprising:

a processor;

at least one network interface configured to communicatively connect the IED to a remote IED via a limited bandwidth communication link;

a computer readable storage medium in communication with the processor, the computer readable storage medium comprising:

an interface module configured to receive a request to manage the remote IED and to receive login credentials associated with an operator profile of the remote IED;

a remote procedure call (RPC) client module configured to transmit received login credentials to the remote IED and request sparse data from the remote IED in order to render a first locally stored template;

a template rendering module configured to render the first locally stored template using the sparse data in order to present a management interface for the remote IED;

wherein the interface module is further configured to receive a request to modify a setting within the management interface for the remote IED and determine what settings data should be transmitted to the remote IED in order to modify the setting on the remote IED;

wherein the RPC client module is further configured to transmit the settings data to the remote IED in order to modify the setting and receive a confirmation from the remote IED that the setting has been modified; and wherein the template rendering module is further configured to render a second template using the received confirmation in order to present a confirmation interface for the remote IED.

20. The system of claim 19, wherein a request to modify a setting comprises a request to modify a network setting on the remote IED.

21. The system of claim 19, wherein a request to modify a setting comprises a request to modify an operator profile on the remote IED.

22. The system of claim 19, wherein the IED comprises an encryption transceiver.

23. The system of claim 19, wherein the local IED communicates with the remote IED using remote procedure calls via a remote procedure call (RPC) client.

24. The system of claim 19, wherein the template rendering module is configured to:

select the first locally stored template based on an access level associated with the operator profile; and render the selected first locally stored template using the sparse data in order to present a management interface for the remote IED.

25. The system of claim 19, wherein the interface module is configured to present the management interface for the remote IED as a web client interface.

\* \* \* \* \*